United States Patent
Arnold et al.

(10) Patent No.: US 6,328,235 B1
(45) Date of Patent: Dec. 11, 2001

(54) PROCESS AND APPARATUS FOR DECOMPOSITION OF ARTICLES

(75) Inventors: Hans-Uwe Arnold, Alzenau; Bernhard Christ, Russelsheim; Friedrich-W. Ledebrink, Neuberg, all of (DE)

(73) Assignee: DETEC Decommissioning Technologies GmbH, Alzenau (DE)

( * ) Notice: Subject to any disclaimer, the term of this patent is extended or adjusted under 35 U.S.C. 154(b) by 0 days.

(21) Appl. No.: 09/383,225

(22) Filed: Aug. 26, 1999

(30) Foreign Application Priority Data

Aug. 28, 1998 (DE) .............................................. 198 39 045

(51) Int. Cl.[7] .................................................. B02C 19/00
(52) U.S. Cl. ............................................. 241/30; 241/283
(58) Field of Search ...................... 241/283, 30; 83/13, 83/651.1, 930

(56) References Cited

U.S. PATENT DOCUMENTS 4,208,931 * 6/1980 Collins ................................ 83/651.1
5,638,732 * 6/1997 Becker et al. ....................... 83/651.1

FOREIGN PATENT DOCUMENTS

| 3940691 | 6/1991 | (DE) . |
| 4027156 | 3/1992 | (DE) . |
| 69501171 | 6/1998 | (DE) . |
| 0327841 | 8/1989 | (EP) . |
| WO97/30457 | 8/1997 | (WO) . |

* cited by examiner

Primary Examiner—Mark Rosenbaum
(74) Attorney, Agent, or Firm—Dennison, Scheiner, Schultz & Wakeman

(57) ABSTRACT

The invention relates to a process and an apparatus for decomposing articles, especially contaminated articles, by means of a decomposition device. To make it possible to the use an easily manipulated decomposition device while avoiding bulky devices, and at the same time to enable in-situ decomposition, in the tightest possible space, in a way that suits packing needs, it is proposed that the decomposition device execute an oscillating motion such that as a function of the progress and/or duration of the decomposition of the article, a varying resultant of the direction of decomposition force introduced by the decomposition device is established.

11 Claims, 2 Drawing Sheets

Figure 2:
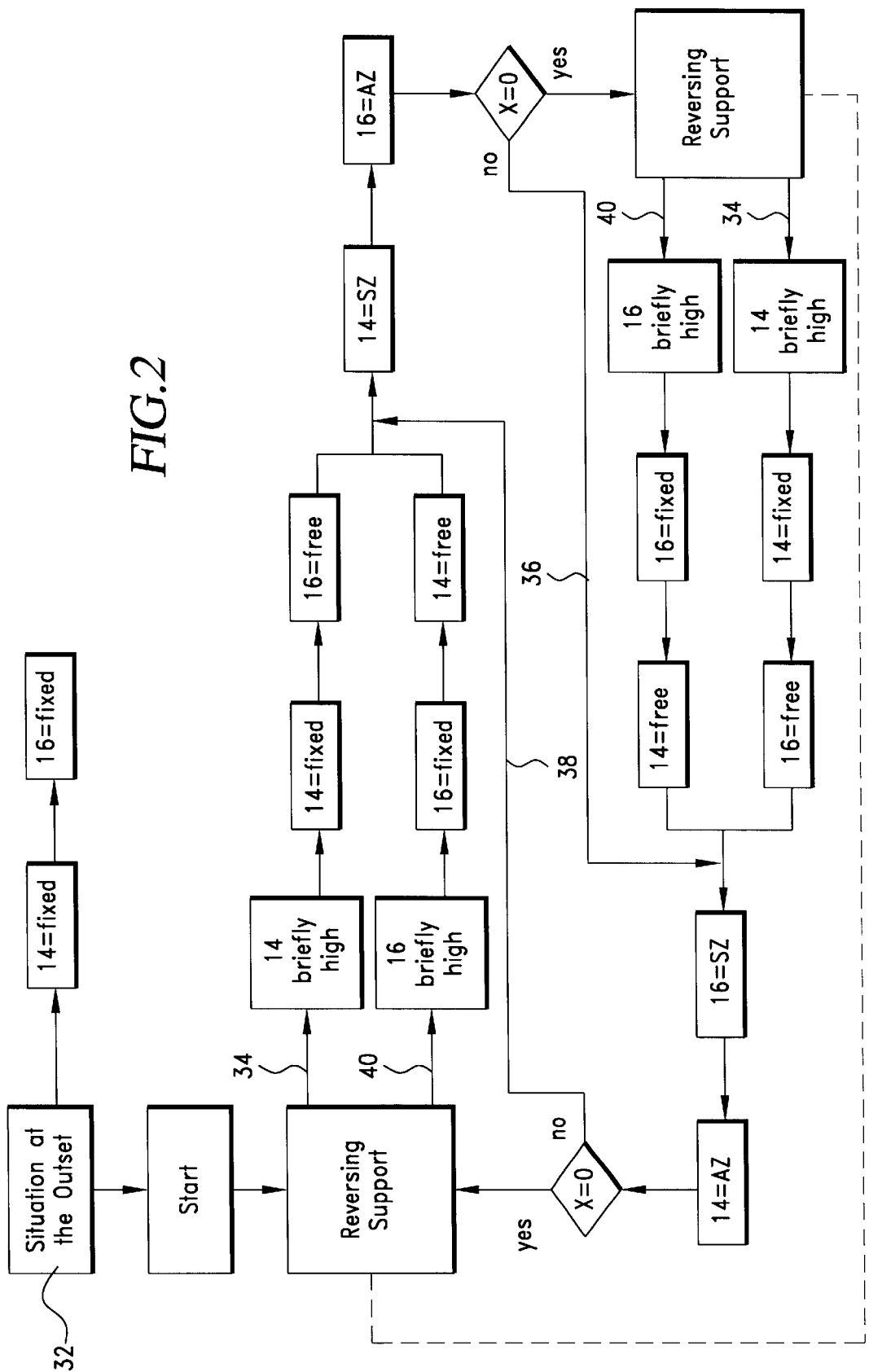

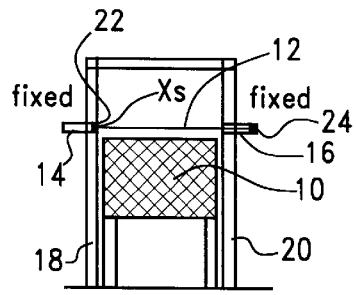
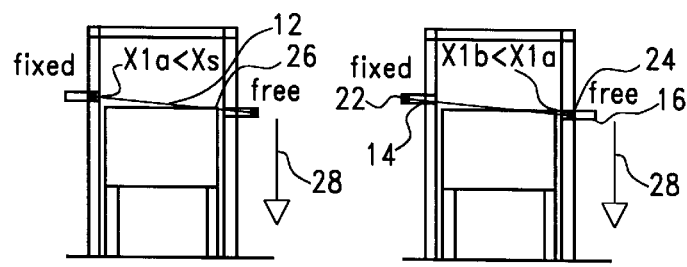
FIG.1a  FIG.1b  FIG.1c
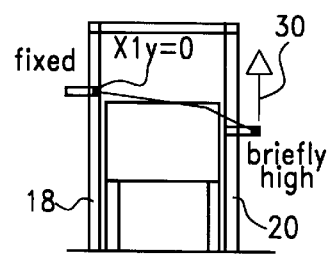 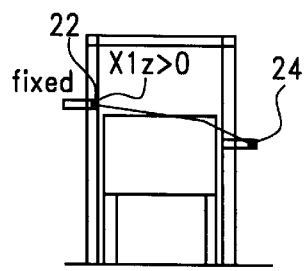 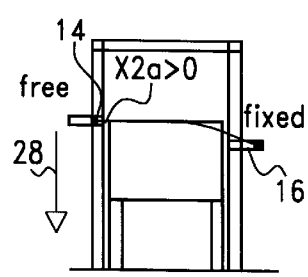
FIG.1d  FIG.1e  FIG.1f
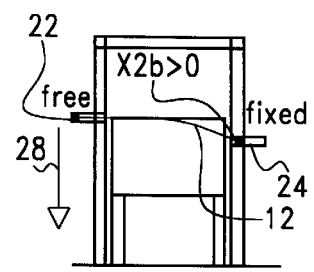 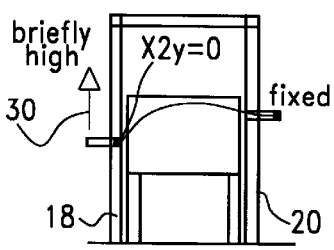 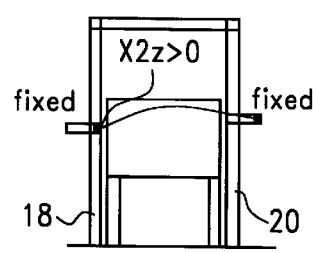
FIG.1g  FIG.1h  FIG.1i
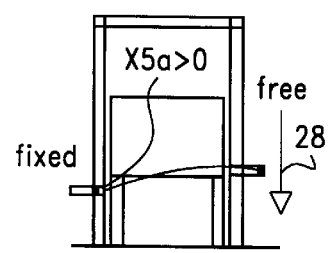 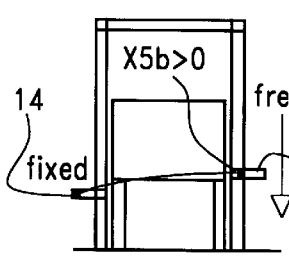 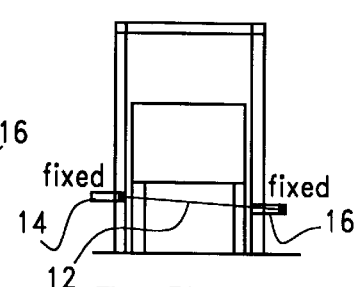
FIG.1k  FIG.1l  FIG.1m

PROCESS AND APPARATUS FOR DECOMPOSITION OF ARTICLES

The invention is based on a process for the decomposition or breaking down of articles, especially contaminated articles, by means of a decomposition device. The invention also relates to a process for the decomposition of articles by means of a flexible grinding element, such as a grinding wire, rope or cable. Finally, the invention relates to an apparatus for decomposition of an article by means of a flexible grinding element, such as a grinding wire, rope or cable.

To dispose of contaminated articles, such as glove boxes or radioactively contaminated heat exchangers, it is known to remove them from the usually tight areas where they were set up and then to pack them unbroken down, or else ship them to a specially set-up decomposition site and decompose them there. Decomposition to a size suitable for packing is preferred, so as to increase the capacity of the typically standardized ultimate disposal containers used. During the decomposition process, by reason of the process, considerable quantities of sometimes dangerous substances are released. In the case of the decomposition of plutonium-contaminated glove boxes, complicated and expensive devices in a special secure work room (caisson, alpha-cell) are therefore necessary as a rule.

To lessen this effort and expense, International Patent Disclosure WO 97/30457 proposes a process in which dangerous substances present in the interior of the articles to be disposed of are prevented from being released by the provision that the articles are made into a foam with material that hardens. In the case of decomposition, these substances are fixed in the region of the interface. The additional filler material at the same time serves the purpose of fixation of the built-in fixtures for the subsequent mechanical decomposition.

It is also known for articles that are to be decomposed to be frozen into a block of ice, and then to saw the block of ice apart, with the components frozen into it (European Patent Disclosure EP 0 327 841 B1).

According to German Patent Disclosure DE 39 40 691 A1, articles are decomposed with the aid of a grinding wire; a varying cutting line has the result that an essentially point-like engagement to the article to be decomposed is obtained. The varying cutting line is attained by supporting the rollers that guide the grinding wire in a fixed spacing from one another in a rotary element, which must be displaced about a fixed axis in a pivoting motion in order to vary the cutting line.

German Patent Disclosure DE 40 27 156 A1 provides a cutting device in the form of a hacksaw, circular saw, or keyhole saw, which can execute both horizontal and vertical motions.

According to German Patent Disclosure DE 695 01 171 T2, particles released in the decomposition can be fixed by means of a binder, in the form of a gel.

While packing articles without prior decomposition suitable for packing leads to incompletely filled ultimate disposal containers and thus to an uneconomical utilization of the ultimate disposal site volume occupied, the preliminary decomposition that is suitable for ultimate disposal purposes often requires transportation to the decomposition site. Additional provisions may then be necessary to prevent recontamination of areas that have already been cleared. In the case where plutonium-contaminated glove boxes are transported, for instance, extremely complicated and expensive provisions in this respect are required.

Regardless of this, decomposition of articles in a way suitable for packing often encounters limits dictated by practical considerations, since the cutting guidance that results for optimal packing must often be guided through heterogeneous cross sections of articles. In steam generators, for instance, cuts must extend through bundled pipes, some of them with resilient spacers, or in the case of glove boxes they must run through motors, hardened guide rails, chain conveyers, lead glass windows, or the like. Because of this, many special tools may be necessary, to enable reliably separating the existing materials and cross sections. It must be taken into account that such special tools, after being contaminated with plutonium, cannot be reused, or can be reused only under special conditions.

To provide a remedy for these problems, universal tools such as band saws can be used, but these are too large for most applications.

But even if the use or scope of special tools required can be reduced by prior clearing away of the intended cutting area, nevertheless expensive provisions are needed to prevent the release of contaminant ions or to prevent a radiation exposure to the human workers.

Freezing articles, as taught by the prior art, entails a major expenditure of energy for freezing and for defined thawing of the cut parts, and is moreover unsuitable for many applications.

If contaminant ions are to be bound, or built-in fixtures are to be fixed in articles by means of organic hard substances, then when the articles are decomposed, an undesired temperature elevation occurs in an interface that leads through the highly insulating foam, and this increase can lead to pyrolysis or fire and thus to the release of contaminant ions. These disadvantages can be eliminated by providing tool cooling, as well, for instance by evaporating inert gas.

The decomposition could be simplified if hard-metal-equipped saws were used. However, it is then necessary for the built-in fixtures of the articles to be properly fixed. This also requires the most perpendicular possible disposition relative to the cutting plane, which in practice leads to difficulties. It is therefore repeatedly found that in band saws, hard metal teeth break off, requiring that the cutting process be repeated, with a completely new cut if the hard metal teeth that have broken off cannot be removed from the cutting seam. There would also be the possibility, using conventional rope saws, of breaking down built-in fixtures in articles, as long as the possibility were available of grinding diamond-coated grinding bodies on the rope free, for instance by means of concrete bodies additionally placed in the cutting area. However, to reduce the frequency with which the grinding bodies catch on sharp edges, cutting must be done with a high rope speed. This increases the problem of a possible rope breakage, however, as well as of severe thermal stress on the fittings, so that relatively great quantities of then-contaminated coolant are produced. In addition, radioactive aerosols can also be spread by a recoiling rope or saw band, this in turn means that to prevent contaminant propagation, both the free-running tool part and the entire work area must be partitioned off with regard to ventilation. This requires a great amount of space, for instance for deflection rollers necessary for guiding the rope. Alternatively, compromises in guiding the cut must be accepted.

The object of the present invention is to refine a process and an apparatus of the type defined at the outset in such a way that by means of an easily manipulated decomposition device, and without using devices that reach in three directions, in-situ decomposition appropriate for packaging becomes possible in the tightest possible spaces. At the same time, it should be assured that the radiation exposure or contamination load is only slight and easily handled.

According to the invention, this object is attained essentially in terms of the process on the one hand in that the decomposition device executes an oscillating motion, in such a way that automatically, as a function of the progress and/or duration of the decomposition of the article, a varying resultant of the direction of the decomposition force introduced by the decomposition device is established. In particular, it is proposed that the article is decomposed by means of grinding, and the decomposition device generates cutting lines that automatically vary continuously in their direction, as a function of the progress and/or duration of the decomposition. In particular, as the decomposition device, a flexible grinding element, such as a grinding wire, rope or cable is used.

According to the invention, a process for in-situ decomposition of articles in a way suitable for ultimate disposal, with and without built-in fixtures, such as plutonium-contaminated glove boxes or radioactively contaminated heat exchangers, with maximal avoidance of any spread of contamination is proposed by using an oscillating grinding tool such as a grinding wire, cable or rope, which is guided in such a way that the positioning force actions are dependent on the progress of the decomposition in such a way that even articles with complex built-in fixtures made of different materials can be decomposed without problems; the primary emphasis is on the feasibility and reliability of the decomposition process, rather than to the replicable decomposition time. By the oscillating motion of the decomposition device, such as a grinding wire, a fundamentally progressive and automatically effected change in the positioning force actions is effected from the standpoint of amount and direction, so that jamming is avoided. To that end, the article to be decomposed is machined from different sides in alternation, with reference to the cutting line; that is, the article is first cut from one side, so that a relief can be performed once a certain cutting depth is achieved, during which the decomposition device, such as a grinding wire, remains in the cutting seam, so that then the decomposition or grinding process can be continued from the other side of the article, and as a result, long, continuous cutting regions over large areas are avoided, and more-efficient action is achieved when using a grinding wire tension.

Compared with known shifting processes, only little space is needed, so that in principle, an advantageous in-situ decomposition is made possible.

Because an oscillating motion of the decomposition device, such as a grinding wire, is achieved, the typical problems involved in a free return of an endless tool with respect to work protection or aerosols are dispensed with.

If a relatively thin grinding wire is used, there is less secondary waste. Worn grinding wires take up practically no additional ultimate disposal volume, because there is already space for them in an already-filled ultimate disposal container.

The decomposition process based on grinding has the advantage, over cutting methods using a defined blade such as a saw, that for each application, different particle size proportions with an optimal cutting shape are present, so that materials of plastic, steel, brass, aluminum or blown glass, as well as combinations thereof, can be decomposed simultaneously using the same grinding wire.

Without departing from the invention, it is understood that the possibility also exists of at least partly opening an outer region, which for instance has thick walls or comprises a single material, of an article to be decomposed such as a steam generator, using an especially suitable method for this purpose, such as milling or sawing, or with thick-walled articles, by cryogenic brittle fracture cutting, and only after that to decompose the built-in fixtures successively using the process of the invention.

In order to preclude the release of contaminated materials in the decomposition, a refinement of the invention provides that a material that binds particles released in the decomposition of the article, such as gel-like binder, is applied along a cutting plane through which the cutting line extends. The possibility also exists that a cutting seam originating at the cutting line is acted upon during the decomposition by a gas, such as a binder aerosol or binder mist, that contains material that binds released particles. An action by the gas on the cutting seam or on cutting faces defining it can be electrostatically reinforced. In addition, deposition of the gas can be reinforced by wet condensation, by cooling the seam or the region surrounding it.

A process for decomposition of an article by means of a flexible grinding element such as a grinding wire, rope or cable, in which the grinding element originates at two fixed points, each of which originates at one—that is, a first and a second—drive unit, between which units a region to be decomposed of the articles extends, and in which before the onset of the decomposition the fixed points, with drive units located in the same direction in a terminal position, have a spacing x that is less than the grinding element in its actual length $X+X_S$ between the fixed points, includes the following process steps for decomposing the article:

A) disposition of the fixed points of the drive units outside the article, in such a way that the grinding element is in disengagement with the article;

B) fixation of the first drive unit and motion of the second drive unit, with a simultaneous oscillating grinding motion of the grinding element in the direction of the article, in order to form a seam therein;

C) upon attainment of a spacing between the fixed points of the drive units such that effective oscillation of the grinding element is prevented, spacing apart of the second drive unit, previously moved in the direction of the article, relative to the grinding line; fixation of the second drive unit; and moving the first drive unit in the direction of the grinding line with a simultaneous oscillating motion of the grinding element;

D) upon again reaching the spacing between the fixed points such that effective oscillation of the grinding element is prevented, spacing apart of the first drive unit, previously moved in the direction of the article, from the grinding line; Fixation of the first drive unit; and moving the second drive unit in the direction of the grinding line, with a simultaneous oscillating motion of the grinding element;

E) continuation of process steps C) and D) until the desired decomposition of the article.

In particular, the drive units are moved along guides that extend parallel to one another. What the course of the guides is does not matter here.

The drive units are preferably piston-cylinder units, and in the oscillating motions, one of the drive units acts as work cylinder and the other drive unit acts as a clamping cylinder, and they exchange functions after each stroke.

A direct connection between the drive units is not necessary here, so that positioning in different three-dimensional spaces is possible. This has advantages particularly when glove boxes, which are mounted directly on building walls, are being decomposed.

The process according to the invention does not require parallelism between the guides and the cutting plane or at right angles to it. Because of this, setting up the guides in the work area is simpler, and the time spent in the radiation area by the conversion and dismantling workers is shorter.

With regard to the changeover of the drive units that are adjustable in the direction of the cutting or decomposition line, it can be noted that it is understood that repositioning can already be done whenever the oscillating or in other words reciprocating motion of the grinding element is still effective for the decomposition of the article. Changing the drive unit to be adjusted in the direction of the cutting line can be controlled as a function of the actual length of the stroke of at least one of the pistons, and the stroke itself can be detected via end switches.

An apparatus for the decomposition of an article, by means of a flexible grinding element such as a grinding wire, rope or cable, is characterized in that the apparatus includes two piston-cylinder assemblies; that each piston-cylinder assembly is adjustable along a guide; that between the guides, the article to be decomposed is positioned regionally; that each piston of the piston-cylinder assembly has one fixed point for the grinding element; that the pistons are adjustable in the same direction when the article is being decomposed, and one piston-cylinder assembly in a piston stroke acts as a work cylinder and the other piston-cylinder assembly acts as a clamping cylinder, and in the next stroke they act as a clamping cylinder and work cylinder, respectively; that the fixed points, given pistons each disposed in the same direction in their respective dead center position, upon disengagement of the grinding element with the article, have a spacing X that is less than the grinding element in its actual length between the fixed points; and that upon the decomposition of the article, one of the cylinders is fixed, while the other cylinder is adjustable in the direction of the cutting line to be formed by the grinding element, and vice versa. The guides preferably extend parallel to one another, so that the minimum spacing of the fixed points, with pistons disposed in the same direction, is equivalent to the spacing X.

By means of the tool guidance principle according to the invention in conjunction with the oscillating grinding element such as a grinding wire, the cutting direction (contour cut) can be varied multiple times at an arbitrary angle without requiring a change of tool. It is also possible to guide the grinding element freely in the return stroke, thus simulating endless travel in one direction. As a result, seam material occurs at only one point, which has advantages in certain applications.

The cylinders themselves are preferably actuated by compressed air. Hydraulically actuated cylinders can also be used. Other features of the drive units are equally possible without departing from the teaching of the invention. On the contrary, it is definitive that the grinding element in the decomposition, or grinding, executes an oscillating motion, and one drive unit is movable in the direction of the cutting line while the other drive unit is simultaneously fixed, so that when a predetermined minimum stroke of the pistons or of one piston is attained, the previously moving drive unit can be fixed while the other drive unit is adjusted in the direction of the cutting line. As a result, what occurs first is a decrease in the spacing between the fixed points, which once the spacing X has been exceeded then increases again up to a spacing at which the minimum stroke, which can be ascertained with an end switch, for instance, is defined by the rope length $X+X_S$.

Further details, advantages and characteristics of the invention will become apparent not merely from the claims and the characteristics—singly and/or in combination—that can be learned from them, but also from the ensuing description of a preferred exemplary embodiment in conjunction with the drawing.

Shown are:

FIG. 1, a process sequence for decomposing an article, such as a glove box, and FIG. 2, a flowchart that illustrates the process sequence of FIG. 1.

FIG. 1 is intended to illustrate the decomposition of an article 10 by means of a flexible grinding element in the form of a grinding wire 12 coated for instance with tungsten carbide, which originates at piston-cylinder assemblies 14, 16 that are displaceable along guides 18, 20. The guides 18, 20 extend parallel to one another and are disposed on opposite sides of the article 10.

The wire 12 itself originates at fixed points 22, 24 of the piston of the piston-cylinder assembly 14, 16 that is displaceable inside the cylinder thereof.

In the starting position (FIG. 1a), the cylinder assembly 14, 16 are located above the article 10 and are oriented in the same direction. In the exemplary embodiment, to that end, the pistons of the piston-cylinder assembly 14, 16 have been displaced toward the right, so that the fixed points 22, 24 are accordingly located in their respective right-hand terminal position. The spacing between the fixed point 22, 24, with the pistons located in the same-direction dead center position, is X. By comparison, the length of the wire 12 between the fixed points 14, 16 is $X+X_S$.

In the cutting operation itself, the piston-cylinder assemblies 14, 16 act in alternation as work cylinders (AZ) and clamping cylinders (SZ), and as a result the grinding wire 12 executes an oscillating motion. Because in the outset state the wire 12 is longer by the amount $X_S$ than the inside spacing between the fixed points 22, 24, when the wire 12 is tensed the future work cylinder (AZ) is leading by the amount $X_S$ (that is, its stroke is shortened by that amount), while the other cylinder, then acting as a clamping cylinder (SZ), is still at its outer dead center point.

In other words, the piston of the piston-cylinder assembly 14 moves to the left, in order to tense the wire 12, without the fixed point 24, which originates at the piston of the piston-cylinder assembly 16, being moved. As a result, the possibility exists of beginning to cut the article 10 obliquely on alternating sides as indicated in the drawing, and at the same time a control signal can be generated in a simple way. To that end, in the exemplary embodiment, the piston-cylinder assembly 14 is fixed to the guide 18 via a support, not shown, while conversely the piston-cylinder assembly 16 is adjustable along the guide 20 in the direction of the cutting line to be formed in the article 10 (arrow 28). The wire 12 thus begins to cut the article 10 in its right-hand peripheral region 26. Because the spacing between the piston-cylinder assemblies 14, 16 increases with increasing motion of the piston-cylinder assembly 16 toward the bottom of the article 10, the stroke of the pistons of the piston-cylinder assemblies 14, 16 is reduced in length. When a predetermined minimum stroke is achieved (this state is shown in FIG. 1d) a control signal is tripped, and the piston-cylinder assembly 16 is then raised (arrow 30) along the guide 20 by means of the support, not shown, so that a shortening of the spacing between the fixed points 22, 24 results. The piston-cylinder assembly 16 is then fixed (FIG. 1e), so that in the way described above the piston-cylinder assembly 14 can be moved along the guide 18 in the direction of the article 10, with the wire 12 executing an oscillating motion at the same time. This manipulation is illustrated in FIGS. 1e through 1g.

As soon as the wire 12 is shortened because of the course of the wire 12 between the fixed points 22, 24, the positioning of the piston-cylinder assemblies 14, 16 to one another, and the motion of the wire 12 along the cutting line, an oscillating motion is not, or is no longer, effectively possible because of the restricted stroke motion, so that a signal is again generated, causing the piston-cylinder assembly 14 now to be lifted in the direction of the arrow 30 and then fixed (FIG. 1h), so that then the piston-cylinder assembly 18 can be lowered along the guide 16 (FIGS. 1k, 1l) as in the process sequence in FIGS. 1b through 1d, until the article 10 is finally severed (FIG. 1m) along a cutting face.

The process described thus far is also illustrated in the flow chart of FIG. 2.

Thus in the outset position 32, the piston-cylinder assembly 14 and the piston-cylinder assembly 16 are each fixed on the respective guide 18, 20.

The spacing of the fixed points 22, 24 between the pistons aimed in the same direction, in their respective terminal positions, is less than the actual length of the wire 12 between the fixed points 22, 24. The decomposition process is then started, so that either, as indicated by the process sequence 34, the piston-cylinder assembly 14 can be fixed and the piston-cylinder assembly 16 can be moved along the guide 28 in the direction of the article 10. (Alternatively, the process sequence 34 can be executed, in which the piston-cylinder assembly 16 is fixed and the piston-cylinder assembly 14 is movable. By means of the respective previous process step 36, 38, once one step has been executed, the piston-cylinder assembly 14 or 16 is first briefly raised—as has been explained in conjunction with FIGS. 1d and 1g—so that a stroke motion for the piston-cylinder assembly 14, 16 and thus the necessary oscillation of the wire 12 can be made possible.)

With the fixation of the piston-cylinder assembly 14 and the adjustability of the piston-cylinder assembly 16, one of the piston-cylinder assemblies, such as the piston-cylinder assembly 14 is then a clamping cylinder (SZ), while the other piston-cylinder assembly 16 is the work cylinder (AZ). As soon as the pistons can execute the stroke X required for the severing, or in other words when the stroke X is not equal to zero, a switchover of the directions of action of the piston-cylinder assemblies 14, 16 is made; that is, the piston-cylinder assembly 16 is now a clamping cylinder, and the piston-cylinder assembly 14 is now the work cylinder. The loops 36, 38 in the flow chart are thus executed. This exchange continues until the stroke x has dropped below a predetermined value, which is indicated in FIG. 2 as X=0. Once this has been attained, reversing the supports ("reversing support") of the piston-cylinder assemblies 14, 16 is made, such that the previously fixed piston-cylinder assembly 14, after the previously free piston-cylinder assembly 16 has been briefly raised, is movable and the piston-cylinder assembly 16 is fixed, as the process sequence 40 in FIG. 2 illustrates. This changeover between a fixed piston-cylinder assembly and a piston-cylinder assembly that is adjustable in the direction of the cutting line, and that function as a work cylinder and a clamping cylinder, respectively, is made until such time as the article 10 has been decomposed (FIG. 1m).

What is claimed is:

1. A method for decomposing an object into pieces comprising the steps of:

providing a frame having at least a first and a second elongate member each having a longitudinal axis;

mounting first and second reciprocating cylinders on said first and second members;

connecting a grinding wire or grinding rope between said first and second cylinders;

moving said first reciprocating cylinder along said longitudinal axis of said first elongate member in a first direction to bring said wire into contact with the object; and, reciprocating said first and second cylinders to cause said wire to oscillate and decompose the object.

2. The method of claim 1 including the additional step of moving said first cylinder in said first direction as the decomposing of said object progresses.

3. The method of claim 2 wherein each of said cylinders has a stroke length, the stroke length decreasing as said first cylinder moves away from said second cylinder, and including the additional step of sensing the stroke length of said first cylinder.

4. The method of claim 3 including the additional steps of detecting when said stroke length has reached a given minimum length, moving said first cylinder in a second direction opposite to said first direction when said stroke length reaches said given minimum length and stopping the movement of said first cylinder in said second direction when said stroke length has reached a second given length.

5. The method of claim 4 including the additional step of moving said second cylinder in said first direction along said second member after said first cylinder stops moving in said second direction.

6. The method of claim 1 wherein the position of said first and said second cylinders on said elongate members is varied while said cylinders oscillate to vary the amount and direction of the force applied against the object by said wire.

7. The method of claim 1 wherein said wire contacts the object along a grinding line and wherein the position of said first and second cylinders on said elongate members is varied to continuously vary the length of said grinding line.

8. The method of claim 1 including the additional step of applying a gel-like binder to the object while the wire is in contact with the object.

9. The method of claim a 1 including the additional step of spraying a binder material on the object while the wire is in contact with the object.

10. The method of claim 9 including the additional step of applying a charge to the object to electrostatically attract the sprayed binder material.

11. The method of claim 1 including the additional step of applying a binding material in gaseous form to the object while the wire is in contact with the object and cooling the object to cause some of said gaseous binding material to condense on the object.

* * * * *